US009424612B1

(12) United States Patent
Bright et al.

(10) Patent No.: US 9,424,612 B1
(45) Date of Patent: Aug. 23, 2016

(54) SYSTEMS AND METHODS FOR MANAGING USER REPUTATIONS IN SOCIAL NETWORKING SYSTEMS

(75) Inventors: Travis Bright, Palo Alto, CA (US); Yigal Dan Rubinstein, Los Altos, CA (US); Christopher Stein, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 415 days.

(21) Appl. No.: 13/565,603

(22) Filed: Aug. 2, 2012

(51) Int. Cl.
*G06F 15/16* (2006.01)
*G06Q 50/00* (2012.01)
*G06F 17/30* (2006.01)

(52) U.S. Cl.
CPC .......... *G06Q 50/01* (2013.01); *G06F 17/30867* (2013.01)

(58) Field of Classification Search
CPC .......................... G06Q 50/01; G06F 17/30867
USPC ........................................................ 709/204
See application file for complete search history.

(56) References Cited

U.S. PATENT DOCUMENTS

| | | | |
|---|---|---|---|
| 6,266,649 B1 * | 7/2001 | Linden ............. | G06Q 10/08345 705/14.51 |
| 7,188,153 B2 | 3/2007 | Lunt et al. | |
| 7,647,306 B2 | 1/2010 | Rose et al. | |
| 7,668,769 B2 | 2/2010 | Baker et al. | |
| 7,797,345 B1 * | 9/2010 | Martino ............. | G06F 17/30867 707/792 |
| 7,797,732 B2 * | 9/2010 | Tam et al. ........................ | 726/3 |
| 7,802,290 B1 * | 9/2010 | Bansal et al. ..................... | 726/3 |
| 7,831,536 B2 * | 11/2010 | Ghosh et al. ..................... | 706/46 |
| 8,051,074 B2 * | 11/2011 | Eom ..................... | G06F 17/211 707/722 |
| 8,150,853 B2 | 4/2012 | Tantrum et al. | |
| 8,176,057 B2 | 5/2012 | Kim et al. | |
| 8,325,215 B2 | 12/2012 | Ristock et al. | |
| 8,364,605 B2 | 1/2013 | Rosenthal et al. | |
| 8,380,721 B2 * | 2/2013 | Attaran Rezaei . | G06F 17/30675 707/715 |
| 8,490,166 B2 | 7/2013 | Frank et al. | |
| 8,521,128 B1 * | 8/2013 | Welsh ................. | H04M 1/7253 455/404.2 |
| 8,570,861 B1 * | 10/2013 | Brandwine ............ | H04L 45/00 370/230 |
| 8,621,642 B2 | 12/2013 | Bjorn et al. | |
| 8,682,723 B2 * | 3/2014 | Parsons et al. ............. | 705/14.52 |
| 8,818,839 B2 | 8/2014 | Leff et al. | |
| 8,918,904 B2 | 12/2014 | Sanin et al. | |
| 8,966,602 B2 | 2/2015 | Gandhi et al. | |
| 8,995,775 B2 | 3/2015 | Fung | |
| 2005/0246420 A1 * | 11/2005 | Little, II ............... | G06Q 10/107 709/204 |
| 2006/0168006 A1 | 7/2006 | Shannon et al. | |
| 2006/0253581 A1 * | 11/2006 | Dixon ............... | G06F 17/30861 709/225 |

(Continued)

OTHER PUBLICATIONS

Final Office Action mailed Apr. 11, 2014, for U.S. Appl. No. 13/565,582 of Bright, T., filed Aug. 2, 2012.

(Continued)

*Primary Examiner* — Ario Etienne
*Assistant Examiner* — Blake Rubin
(74) *Attorney, Agent, or Firm* — Perkins Coie LLP

(57) ABSTRACT

To determine and quantify the reputations of users within a social network. In an embodiment, a social networking system determines at least one category associated with a first account of a social networking system. The social networking system determines a first reputation score for the first account in the at least one category. The category may represent subject matter in which a user of the first account has an interest. The first reputation score may be based on content posted by the first account. The first reputation score may be adjusted based on an activity and the scores of others.

20 Claims, 12 Drawing Sheets

(56) References Cited

U.S. PATENT DOCUMENTS

| | | | |
|---|---|---|---|
| 2006/0294085 A1* | 12/2006 | Rose et al. | 707/3 |
| 2007/0064626 A1* | 3/2007 | Evans | G06Q 10/10 370/254 |
| 2007/0106582 A1 | 5/2007 | Baker et al. | |
| 2007/0208940 A1* | 9/2007 | Adelman | G06Q 10/107 713/168 |
| 2007/0250500 A1* | 10/2007 | Ismalon | G06F 17/3064 |
| 2008/0005064 A1* | 1/2008 | Sarukkai | 707/3 |
| 2008/0140650 A1* | 6/2008 | Stackpole | G06F 17/3087 |
| 2008/0275719 A1* | 11/2008 | Davis | G06Q 30/02 705/1.1 |
| 2008/0288277 A1* | 11/2008 | Fasciano | 705/1 |
| 2009/0089321 A1* | 4/2009 | Yang et al. | 707/102 |
| 2009/0210244 A1* | 8/2009 | Koister et al. | 705/1 |
| 2009/0213133 A1* | 8/2009 | Kawamura et al. | 345/589 |
| 2009/0240564 A1* | 9/2009 | Boerries et al. | 705/10 |
| 2009/0299824 A1* | 12/2009 | Barnes, Jr. | G06F 3/04847 705/7.39 |
| 2010/0010826 A1* | 1/2010 | Rosenthal | G06Q 99/00 705/1.1 |
| 2010/0132043 A1* | 5/2010 | Bjorn et al. | 726/25 |
| 2010/0165887 A1* | 7/2010 | Ristock et al. | 370/260 |
| 2010/0179756 A1* | 7/2010 | Higgins | G01C 21/20 701/414 |
| 2010/0179874 A1* | 7/2010 | Higgins | G06K 9/00664 705/14.53 |
| 2010/0250605 A1* | 9/2010 | Pamu et al. | 707/783 |
| 2010/0257183 A1* | 10/2010 | Kim et al. | 707/748 |
| 2010/0325110 A1 | 12/2010 | Tantrum | |
| 2011/0078156 A1* | 3/2011 | Koss | G06Q 10/04 707/748 |
| 2011/0218948 A1 | 9/2011 | De Souza et al. | |
| 2011/0238763 A1* | 9/2011 | Shin | G06Q 10/10 709/206 |
| 2011/0252121 A1* | 10/2011 | Borgs et al. | 709/223 |
| 2011/0314007 A1* | 12/2011 | Dassa | G06F 17/30893 707/723 |
| 2012/0071236 A1* | 3/2012 | Ocko | A63F 13/12 463/29 |
| 2012/0137367 A1* | 5/2012 | Dupont | G06F 21/00 726/25 |
| 2012/0159647 A1* | 6/2012 | Sanin et al. | 726/28 |
| 2012/0174203 A1 | 7/2012 | Frank | |
| 2012/0197750 A1* | 8/2012 | Batra | G06F 17/30592 705/26.7 |
| 2012/0209832 A1* | 8/2012 | Neystadt et al. | 707/723 |
| 2012/0246230 A1* | 9/2012 | Ferbar | G06Q 50/01 709/204 |
| 2012/0281911 A1 | 11/2012 | Fung et al. | |
| 2012/0290427 A1* | 11/2012 | Reed et al. | 705/26.2 |
| 2013/0066884 A1* | 3/2013 | Kast | G06N 5/04 707/748 |
| 2013/0085804 A1* | 4/2013 | Leff et al. | 705/7.29 |
| 2013/0117832 A1* | 5/2013 | Gandhi et al. | 726/7 |
| 2013/0144949 A1* | 6/2013 | Mitchell, Jr. | G06Q 10/101 709/204 |
| 2013/0166374 A1* | 6/2013 | Capuozzo | G06Q 30/0282 705/14.43 |
| 2013/0268470 A1* | 10/2013 | Yablokov | G06Q 10/107 706/15 |
| 2013/0317941 A1* | 11/2013 | Stoll et al. | 705/26.35 |
| 2014/0324624 A1* | 10/2014 | Ward | H04W 4/021 705/26.7 |

OTHER PUBLICATIONS

Non-Final Office Action mailed Nov. 29, 2013, for U.S. Appl. No. 13/565,582 of Bright, T., filed Aug. 2, 2012.

U.S. Appl. No. 13/565,582, of Bright, T. et al., filed Aug. 2, 2012.

* cited by examiner

|  | 502 | 504 | 506 |
|---|---|---|---|
|  | Variable | Importance | Reliability |
|  | NumFriendsWhoRemovedMe | 4192.2 | 100% |
| 508 | NumRejectedFriendRequests | 6210.8 | 100% |
|  | NumGroupsJoined | 2066.1 | 100% |
|  | NumSentFriendRequests | 5108.1 | 100% |
|  | NumReceivedFriendRequests | 3221.4 | 100% |
|  | NumPhotoTagsRemoved | 5180.6 | 100% |
|  | UserAgent | 4286.3 | 80% |
| 510 | Registration IP | 4101.4 | 60% |
|  | LastLogin IP | 3218.4 | 60% |
|  | NumProfilePics | 4011.8 | 100% |
|  | NumFriends | 3162.7 | 100% |
|  | ⋮ | ⋮ | ⋮ |

Anyone have any recommendations for a good sushi restaurant in Mountain View?   Try XYZ Sushi on Main St. It's a little pricey, but really good!

930
Anyone have any recommendations for a good sushi restaurant in Mountain View?
—940

950
Try XYZ Sushi on Main St. It's a little pricey, but really good!
—960

FIGURE 9D

Sushi Reputation
    Jane Doe:   34.6  →  36.6
    Jeff Smith:  52.3  →  56.3

Camera Reputation
    Jane Doe:   42.4 unchanged
    Jeff Smith:  32.1 unchanged

FIGURE 9E

SYSTEMS AND METHODS FOR MANAGING USER REPUTATIONS IN SOCIAL NETWORKING SYSTEMS

FIELD OF THE INVENTION

The present invention relates to the field of social networking. More particularly, the present invention provides a technique for determining and quantifying the reputations of the users of a social network.

BACKGROUND

Internet social networks have become a ubiquitous phenomenon. Social networks allow an internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Frequently, most information on a user's profile is only accessible to the user's friends.

As the users of social network generate content and engage in activity, they come to be perceived by other users in certain ways. Some users may generate content that is seen as insightful or interesting. Other users may generate content that is seen as inane or irrelevant. Users may generate content and engage in activity that reflects their interests. Thus, a user's reputation amongst his fellow users may be based on the content he generates and the activity he engages in. Users may be perceived positively or negatively by fellow users, or they may come to be known as experts or enthusiasts in certain fields. In addition, users may be likely to form friendships with like-minded users who share their views and interests.

SUMMARY OF THE INVENTION

To determine and quantify the reputations of users within a social network, a social networking system determines at least one category associated with a first account of a social networking system. The social networking system determines a first reputation score for the first account in the at least one category.

In an embodiment, the category may represent subject matter in which a user of the first account has an interest. The category may be determined based on web browsing history of the first account or on interaction of the first account with a website. The category may further be based on correlation of the website with one of a plurality of selected categories. The website may be integrated at least in part with the social networking system. The website may be published by the social networking system.

In an embodiment, the first reputation score may be based on content posted by the first account, or on a semantic analysis of content associated with the first account. The first account may be associated with a reputation score for each of a plurality of categories. The first reputation score may be determined by setting the first reputation score to a value based on data external to the social networking system. The first account may be associated with the first reputation score in a first category and a second reputation score in a second category.

In an embodiment, the first reputation score and the second reputation score may have different values. The first reputation score may be adjusted based on an activity. The second reputation score may also be adjusted based on the activity, wherein the first reputation score and the second reputation score are adjusted differently. The second reputation score may be maintained based on the activity. A second reputation score of a second account may be adjusted based on the first reputation score of the first account. A third reputation score of a third account may be adjusted based on the second reputation score of the second account.

Many other features and embodiments of the invention will be apparent from the accompanying drawings and from the following detailed description.

BRIEF DESCRIPTION OF THE DRAWINGS

FIG. 5 depicts a table illustrating a series of example attributes used to compute an authenticity score and reputation scores of an account in accordance with an embodiment of the invention.

FIG. 9C depicts a semantic analysis of the status update and the comment used to determine the category of a reputation score in accordance with an embodiment of the invention.

FIG. 9D depicts a detailed semantic analysis of the status update and the comment used to determine the magnitude by which each user account's reputation score is to be increased in accordance with an embodiment of the invention.

FIG. 9E depicts reputation scores for two accounts of the social networking system following the status update and the comment in accordance with an embodiment of the invention.

DETAILED DESCRIPTION

Social Networking System Architecture

Figure 1:
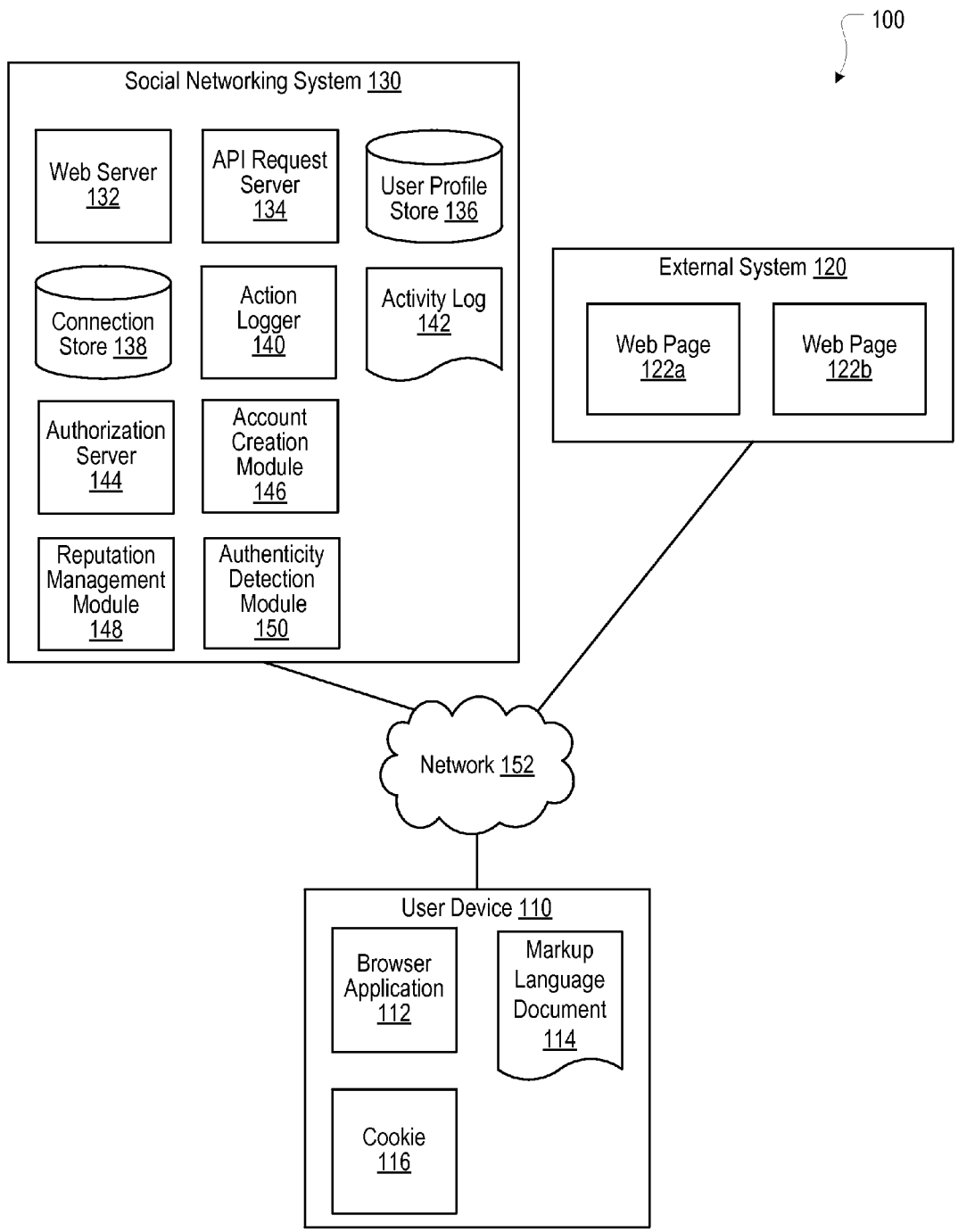
FIG. 1 depicts a system for detecting fake accounts within a social networking system in accordance with an embodiment of the invention.

FIG. 1 depicts a system 100 for detecting fake accounts and managing reputations associated with users of a social networking system 130 in accordance with an embodiment of the invention. The system 100 includes one or more user devices 110, one or more external systems 120, the social networking system 130, and a network 152. For purposes of illustration, the embodiment of the system 100 shown by FIG. 1 includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform, or backbone, which other systems, such as external systems 120, may use to provide social networking services and functionalities to users across the Internet.

The user device 110 comprises one or more computing devices that can receive input from a user and can transmit and receive data via the network 152. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 152. The user device 110 can execute an application, for example, a browser application that allows a user of the user device 110 to interact with the social networking system 130. The user device 110 is configured to communicate with the external system 120 and the social networking system 130 via the network 152, which may comprise any combination of local area and/or wide area networks, using wired and/or wireless communication systems.

In one embodiment, the network 152 uses standard communications technologies and/or protocols. Thus, the network 152 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 152 can include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over the network 152 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers including one or more web pages 122a, 122b, which are communicated to the user device 110 using the network 152. The external system 120 is separate from the social networking system 130. For example, the external system 120 is associated with a first domain, while the social networking system 130 is associated with a separate social networking domain. Web pages 122a, 122b included in the external system 120 comprise markup language documents identifying content and including instructions specifying formatting or presentation of the identified content.

The social networking system 130 comprises one or more computing devices storing a social network, or a "social graph", including a plurality of users, and providing users of the social network with the ability to communicate and interact with other users of the social network. Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of a social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system 130 may belong, events or calendar entries in which a user might be interested, computer-based applications that a user may use via the social networking system 130, transactions that allow users to buy or sell items via the service, and interactions with advertisements that a user may perform on or off the social networking system 130. These are just a few examples of the items upon which a user may act on a social networking system 130, and many others are possible. A user may interact with anything that is capable of being represented in the social networking system 130 or in the external system 120, separate from the social networking system 130, coupled to the social networking system 130 via the network 152.

The social networking system 130 is also capable of linking a variety of entities. For example, the social networking system 130 enables users to interact with each other as well as external systems 120 or other entities through an API or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph represents a particular kind of connection, or association, between the two nodes, which may result from node relationships or from an action that was performed by one of the nodes on the other node. For example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. Each instance of a user posting or creating a content item generates a news story, which is visible to the user's friends or followers within their respective news feeds. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, an account creation module 146, a reputation management module 148, and an authenticity detection module 150. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains user profiles, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, and the social networking system 130 generates a new instance of a user profile in the user profile store 136, assigns a unique identifier to the user profile, and begins to populate the fields of the user profile with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136 and the activity log 142 enables the social networking system 130 to generate the social graph that uses nodes to identify various objects and edges connecting nodes to identify relationships between different objects. For example, if a first user establishes a connection with a second user in the social networking system 130, user profiles of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 152. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to access information from the social networking system 130 by calling one or more APIs. The API request server 134 may also allow external systems 120 to send information to the social networking system 130 by calling APIs. The external system 120, in one embodiment, sends an API request to the social networking system 130 via the network 152, and the API request server 134 receives the API request. The API request server 134 processes the request by calling an API associated with the API request to generate an appropriate response, which the API request server 134 communicates to the external system 120 via the network 152. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 is associated with each user's profile, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user profile information like profile photo, phone numbers associated with the user, user's connections, actions taken by the user such as adding a connection, changing user profile information, and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information and granularity of specification of entities with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

Fake Account Detection & Reputation Management

As the users of a social network generate content and activity, they may come to be perceived by their fellow users in certain ways. This perception may be positive or negative. In this regard, social networking communities are similar to communities in real life: users who make insightful observations, generate content that others find interesting, and are active participants in the community may come to be highly regarded by their peers. Conversely, users who do not contribute positively to the discourse of the community, do not generate interesting content, or do not participate in the community may come to be perceived negatively or ignored by their peers. Those who are highly regarded may be sought out by their peers for advice, information, or recommendations on a subject in which they have demonstrated expertise.

Social networks can be distinguished from real life communities by many characteristics: for example, the preservation and archival of all activity in electronic form and the regulation of the community by an administrative entity. Unlike a real life community, in a social network, an activity is readily recorded, and the operator of the social network has potential access to activities in which members of the social network have been engaged. These characteristics may be leveraged to quantify and publicize the "reputation" of a user in his social network. For example, a user may come to be known among certain friends as a resident expert on cameras. The user may acquire this reputation by regularly creating camera-related content, posting reviews on cameras, commenting on friends' camera-related threads, or through feedback from others. The social networking system 130 may quantify and publicize the user's reputation as a camera expert to all of his friends or to the social network at large. This functionality allows users who do not frequently interact with the camera expert or his friends to learn of the camera expert's reputation and benefit from his expertise. Alternatively, the user may acquire a negative reputation if he frequently posts content that is seen as irrelevant or inane. For example, a user who frequently posts camera-related content that is viewed as unhelpful, misleading, or incorrect may come to be seen by his fellow users as an unreliable or untrustworthy source of information on cameras. The social networking system may determine a user's reputation by seeking feedback from other users, such as prompts to rate another user's reputation in a particular field or ballots asking users to identify who among them has the best reputation in a particular field. Thus, an automated process that quantifies and continuously updates a user's reputation from the time that his account was created can allow the social networking system 130 to assist users in identifying friends who post insightful content or have expertise in certain fields, subjects, topics, or areas of interest.

Automated quantification of a user's reputation can also facilitate the detection of accounts that are created in violation of the policies of the social networking system 130. The operator of the social networking system 130 may have certain policies in place that limit who may create an account and specify the legitimate purposes for which an account may be created and used. For example, an operator of the social networking system 130 may require that a user create an account only under her true identity. Users may thus be prohibited from creating accounts under aliases or for the purpose of impersonating other people. Similarly, the operator of the social networking system 130 might also have a policy prohibiting users from creating accounts for marketing purposes. Though the operator of the social networking system 130 might permit businesses to use the services of the social networking system 130 for marketing purposes, it may restrict these activities to certain types of accounts that are reserved for businesses and organizations. The operator of the social networking system 130 may wish to keep individual accounts free of marketing or promotional activities. In addition, the operator of the social networking system 130 may limit users to one account per person. Though a legitimate user may wish to keep multiple accounts for purposes that are not malicious or disruptive, the operator of the social networking system 130 might wish to prohibit this behavior in order to minimize abuse and preserve the resources of the social networking system 130. Thus, a fake account may be any account that was created in violation of the policies that regulate use of the social networking system 130.

According to an embodiment of the invention, the social networking system 130 may implement verification procedures during the account creation phase. The social networking system 130 may transmit a new account registration form for creating an account on the social network to a user. The form may request at least a valid email address from the user. The user may complete the form on a desktop PC, a laptop PC, a tablet, or a smartphone. Any device or platform may be used. The user may complete the form and the form data may be transmitted to the social networking system 130. The social networking system 130 may then transmit a challenge-response test to the user. The challenge-response test may be a CAPTCHA script, a simple trivia question, a request to enter a certain date, or any other means of verifying that the form was completed by a human being and not by an automated script. Any challenge-response test may be used. The social networking system 130 may receive the completed form and the response to the challenge-response test from the user and verify the validity of the user's response to the challenge-response test. After verifying the validity of the user's response to the challenge-response test, the social networking system 130 may send an email to the provided email address containing a verification link. The social networking system 130 may receive a page request originating from the verification link, indicating that the email has been opened and the link has been clicked. The social networking system 130 may then activate the newly-created account. According to one embodiment, the account validation procedures may be performed by the account creation module 146 of the social networking system 130.

Despite the use of measures such as email verification links and challenge-response tests, it still can be difficult to prevent users from creating fake accounts. Although email verification links can be used to confirm that an email address indeed belongs to the user who provided it and to prevent people from using the same email address to create multiple accounts, the operator of the social networking system 130 may find it difficult to ensure that two different email addresses used to create two different accounts actually belong to two different people. Similarly, the use of challenge-response tests may prevent people from using automated "bots" to rapidly create multiple accounts, but they do not prevent people from creating fake accounts manually. The operator of the social networking system 130 may attempt to detect abuse by implementing IP address filtering, but this may block or hinder the activities of legitimate users and can be circumvented by users of fake accounts.

The operator of the social networking system 130 may theoretically adopt additional measures to prevent the creation of fake accounts, but these may significantly hinder adoption. For example, the operator of the social networking system 130 may require new users to verify their identity. However, such a policy may make it substantially more difficult to create new accounts. The operator of the social networking system 130 may employ human beings to monitor every registration and flag suspicious new accounts; however, this may be prohibitive for social networks with hundreds of millions of users and hundreds of thousands of new registrations per day. The operator of the social networking system 130 may provide options for legitimate users to flag or report other users whose accounts they suspect are fake, but the degree to which users utilize such functionality may vary, and the potential for abuse is significant (e.g., users reporting other legitimate users as fake due to malice, disputes, or rivalries). Thus, an automated process that quantifies and continuously updates a user's reputation and the likelihood that the user's account is authentic from the time that his account was created would enable the operator of the social networking system 130 to detect and take action against fake accounts.

According to an embodiment, the reputation of an account user and the authenticity of the account may be modeled by the social networking system 130 as at least one score. This score may be represented as a single value that initially encompasses both reputation and authenticity. Upon account creation, the score may be set to a neutral value indicating that the social networking system 130 does not have enough information to determine whether the account is authentic or a fake. The score may be increased or decreased based on the activity of the account user within the social networking system 130 as well as the activities of friends of the user. According to another embodiment, reputation and authenticity can be modeled as a spectrum on which extremely small values correspond to accounts that are highly likely to be fake, whereas large values correspond to accounts that are not only highly likely to be authentic, but whose users are highly regarded by other users in some respect. According to yet another embodiment, once the user's score satisfies or exceeds a threshold value, the score may split into a series of reputation scores denoting the user's reputation in a variety of categories. Each category may correspond to a different field, subject, topic, or area of interest. For example, a new user may gradually boost her account score by engaging in activity related to cameras and sushi. She may regularly comment on camera-related threads, have frequent check-ins at sushi restaurants, and regularly post reviews of new cameras and sushi restaurants. After her score crosses a threshold value indicating that her account is most likely authentic, her score may split into two separate scores representing her reputation for expertise in cameras and sushi, respectively. According to an embodiment, if the user's score decreases past some threshold value, the social networking system 130 may flag it as possibly fake and take responsive action. In addition to authenticity scores and reputation scores, other types of scores are also possible. For example, according to an embodiment, scores relating to different types of spam sent by an account may be determined as described herein. Spam may include commercial spam or low quality content transmitted or posted by an account. As another example, according to an embodiment, "positive" scores relating to education level, political affiliations, and other personal demographic categorizations associated with a user of an account also may be determined. Any type of score may be determined, adjusted, and otherwise managed by the social networking system 130 according to the embodiments described herein.

Figure 2:
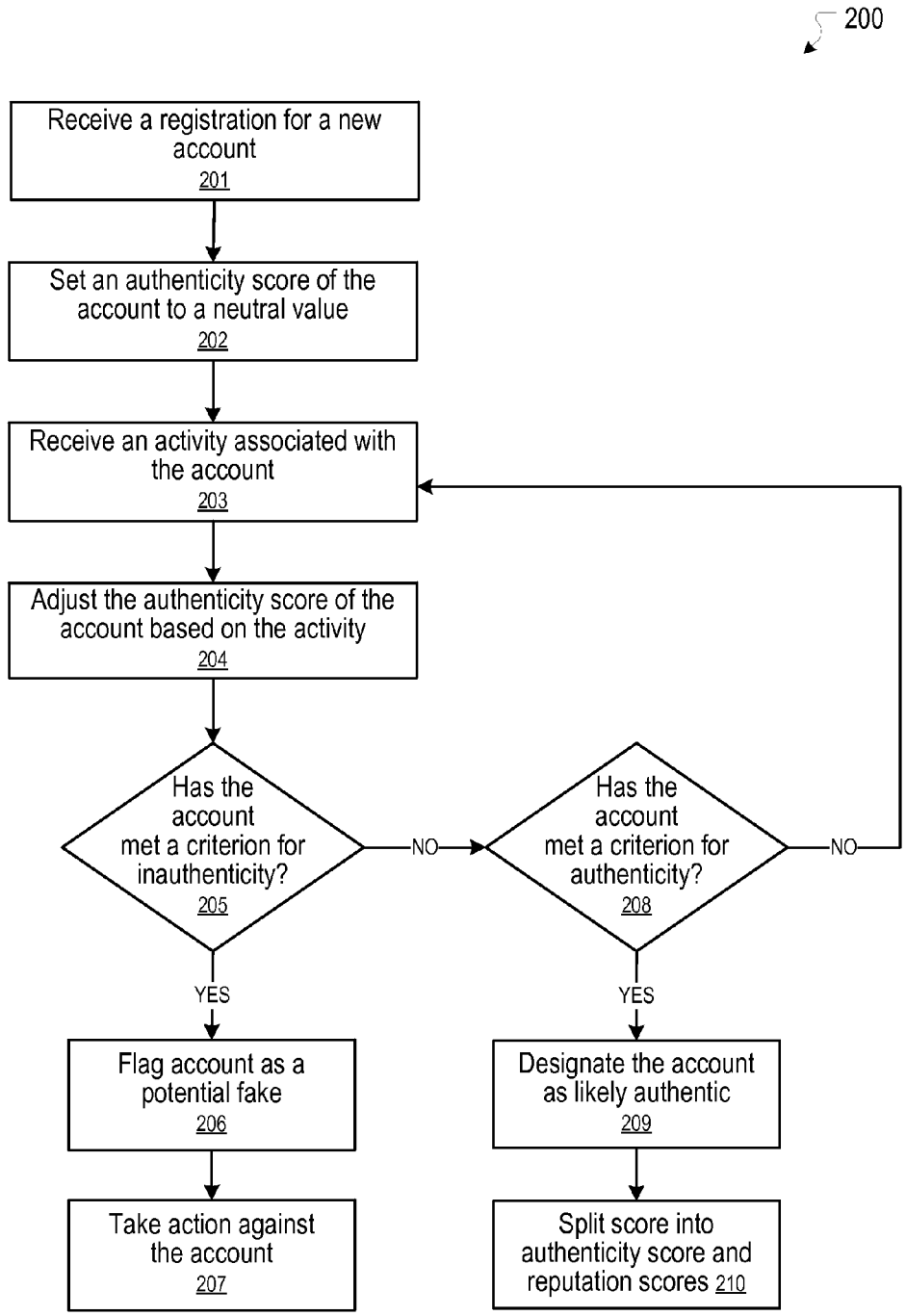
FIG. 2 illustrates a process for initializing and updating authenticity and reputation scores of an account in accordance with an embodiment of the invention.

FIG. 2 illustrates a process 200 for initializing and updating authenticity and reputation scores of an account in accordance with an embodiment of the invention. At block 201, the social networking system 130 receives a new account registration. The account may be registered according to any suitable process for creating and verifying a new account. At block 202, the authenticity score of the account is set to a neutral value. The neutral value may indicate that the social networking system 130 may not have enough information to determine whether the account is authentic or a fake. At block 203, the social networking system 130 receives an activity associated with the account. The activity may be, for example, the addition of a friend, a status update, the uploading of a profile picture, an interaction with another user, creation of content, or any other type of activity. Any suitable activity may be used. The activity may originate from the account or from another account, such as, for example, the account of a friend. At block 204, the social networking system 130 adjusts the account score based on the activity. At block 205, the social networking system 130 determines if the account has met a criterion for inauthenticity (e.g., fakeness). If the account has met a criterion for inauthenticity, then at block 206, the social networking system 130 flags the account as potentially fake. At block 207, the social networking system 130 takes responsive action against the account. The action may range from simply placing the account on an enhanced monitoring list to outright termination. Any suitable action may be used. If the account has not met an inauthenticity criterion, then at block 208, the social networking system 130 determines whether the account has met a criterion for authenticity. If the account has met a criterion for authenticity, then at block 209, the social networking system 130 designates the account as likely authentic. At block 210, the social networking system 130 splits the score into an authenticity score and reputation scores for a variety of different categories. Each category may correspond to a different field, subject, topic, or area of interest. If the user's score has not met a criterion for authenticity, the process returns to block 203 and awaits the receipt of a new activity from the user. The criterion used in blocks 205 and 208 may be a selected threshold of any suitable value against which the account score is compared. According to one embodiment, the process 200 of FIG. 2 may be performed either partially or entirely by the reputation management module 148 or the authenticity detection module 150.

According to an embodiment of the invention, each account may have separate scores for account authenticity and reputation in various categories. Upon creation, a new account may have scores that are set to neutral values and/or zero for each of the account authenticity and reputation categories. As the social networking system 130 receives activities and content associated with the account, the social networking system 130 may determine which category the activity pertains to and modify the corresponding score for that category. According to one embodiment, the social networking system 130 may modify the account authenticity score based on any activity, then modify a reputation score only if it determines that the activity pertains to a particular category. In this embodiment, some types of activities may result in no change to any of the user's reputation scores. This is particularly true if the activity is routine, such as a friend request or the tagging of a photo, or if the activity is not category-specific.

Figure 3:
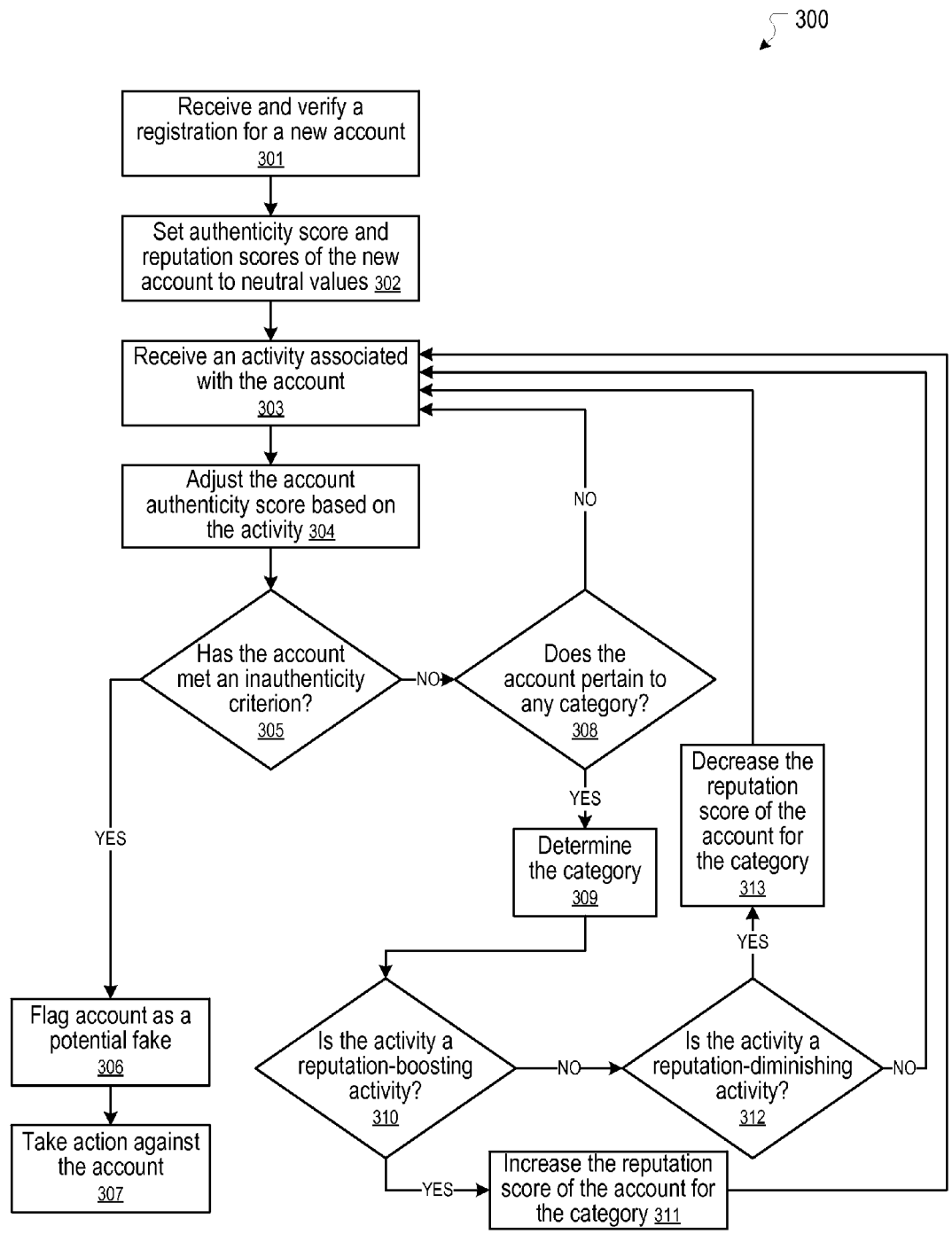
FIG. 3 illustrates a process for initializing and updating the authenticity and reputation scores of an account in accordance with an embodiment of the invention.

FIG. 3 illustrates a process 300 for initializing and updating the authenticity and reputation scores of an account in accordance with an embodiment of the invention. At block 301, the social networking system 130 receives and verifies a registration of a new account. Any suitable process for creating and verifying a new account may be used. At block 302, the authenticity score and reputation scores of the account are set to neutral values. In this embodiment, the user may have an authenticity score and reputation scores for various categories at the outset, but the social networking system 130 may not have enough information to determine whether the account is authentic or that the user has expertise and interest in various fields. At block 303, the social networking system 130 receives an activity associated with the account. The activity may be the addition of a friend, a status update, the uploading of a profile picture, or any other type of activity. The activity may originate from the account or from a friend's account, such as the removal of a photo tag by a user of the friend's account that had been applied by a user of the account.

At block 304, the social networking system 130 adjusts the account's authenticity score based on the activity. At block 305, the social networking system 130 determines if the account has met an inauthenticity (e.g., "fakeness") criterion. The criterion may be a threshold against which the authenticity score is compared. If the account has met an inauthenticity criterion, at block 306, the social networking system 130 flags the account as a potential fake. At block 307, the social networking system 130 takes some action against the account. The action may range from simply placing the account on an enhanced monitoring list to outright termination. Any action may be used. If the account has not met an inauthenticity criterion, the process 300 proceeds to block 308. At block 308, the social networking system 130 determines if the activity pertains to any category. If the activity pertains to a category, then at block 309, the social networking system 130 determines the category. A category may correspond to a particular subject, field, topic, or area of interest. If the activity does not pertain to any category, the process returns to block 303 and awaits the receipt of an activity associated with the account.

At block 310, the social networking system 130 determines if the activity is a reputation-boosting activity. If the activity is a reputation-boosting activity, then at block 311, the social networking system 130 increases the reputation score of the account for the category. The process then returns to block 303 and awaits the receipt of an activity associated with the account. If, at block 310, the activity is not a reputation-boosting activity, the process 300 proceeds to block 312 and determines if the activity is a reputation-diminishing activity. If the activity is a reputation-diminishing activity, then at block 313, the social networking system decreases the reputation score of the account for the category. The process then returns to block 303 and awaits the receipt of an activity associated with the account. If, at block 312, the activity is not a reputation-diminishing activity, then the process returns to block 303 and awaits the receipt of an activity associated with the account. According to one embodiment, the process 300 of FIG. 3 may be performed either partially or entirely by the reputation management module 148 or the authenticity detection module 150.

According to one embodiment of the invention, the social networking system 130 may maintain a series of tiers on which user accounts are kept based on their scores. A newly registered account may initially be placed on authenticity or reputation tiers that include users about whom the social networking system 130 does not have enough information to determine authenticity or reputation, respectively. The various tiers may correspond to varying levels of certainty that the account is authentic or a fake, or varying levels of interest and expertise in different fields. The upper and lower limits of a tier may correspond to score thresholds described in connection with any of the embodiments disclosed herein. In one embodiment, the tiers may be of two types: authenticity tiers and reputation tiers. The authenticity tiers may include a neutral tier for newly created accounts and others about whom the social networking system 130 does not have enough information, a tier for accounts the social networking system 130 has determined are likely to be fake, a tier for accounts the social networking system 130 has determined are indeed fake and slated for deactivation, a tier for accounts the social networking system 130 has determined are likely to be authentic, and a tier for accounts the social networking system 130 has determined are indeed authentic. The reputation tiers may include a tier for accounts belonging to users who have an interest in a particular field, a tier for accounts belonging to users who have expertise in a particular field, and a tier for accounts belonging to users who have mastered a particular field. Any suitable type of tier or combination of tiers may be used. As a user engages in activity, the social networking system 130 may take action in relation to his account by moving it to an adjacent tier when the authenticity or reputation score of the account satisfies a criterion.

Figure 4:
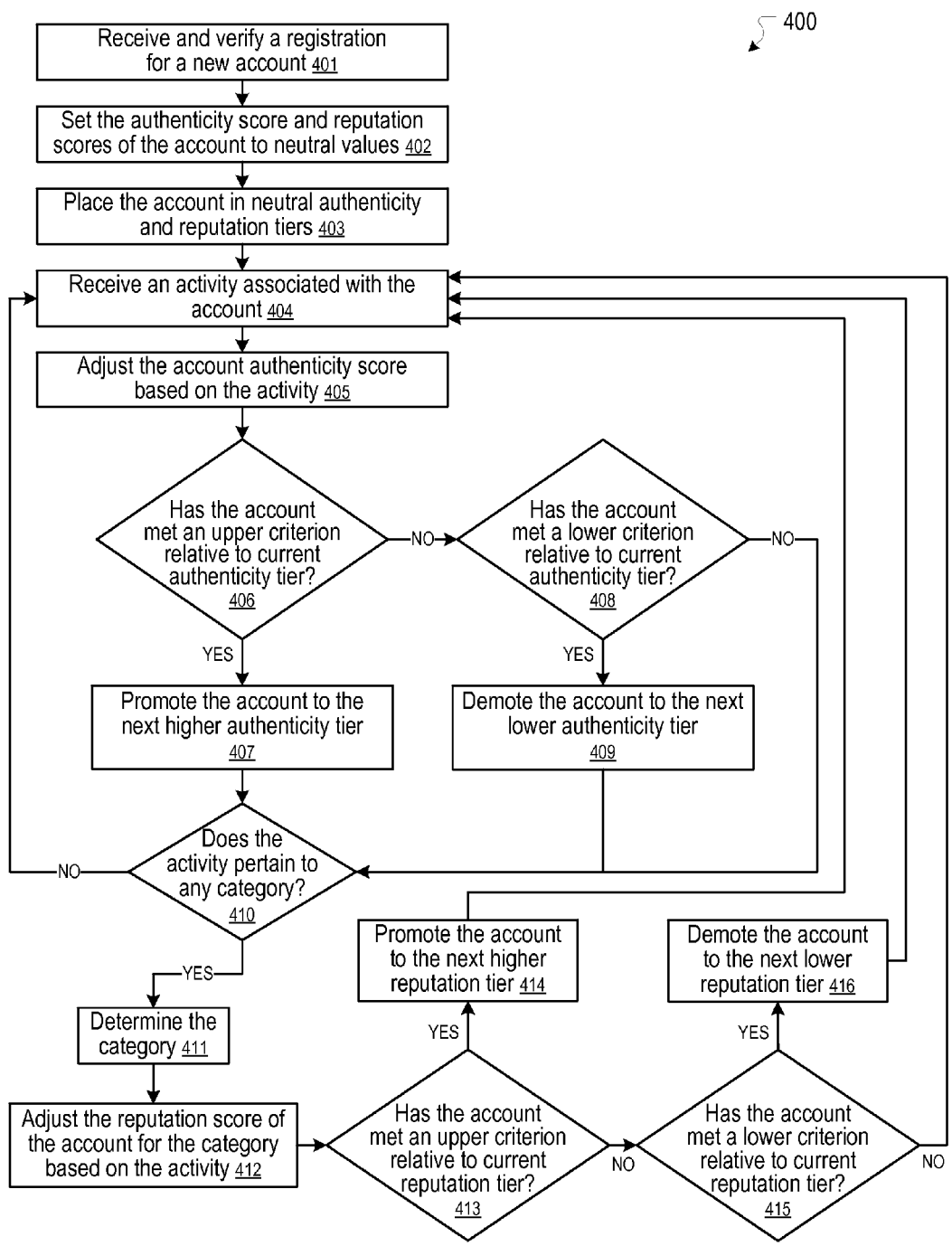
FIG. 4 illustrates a process for classifying accounts in various tiers in accordance with an embodiment of the invention.

FIG. 4 illustrates a process 400 for classifying accounts in various tiers in accordance with an embodiment of the invention. At block 401, the social networking system 130 receives and verifies a registration for a new account. According to one embodiment, block 401 may be performed according to the process 200 illustrated in FIG. 2. Any process for creating and verifying a new account within the social networking system 130 may be used. At block 402, the social networking system 130 sets the authenticity score and reputation scores of the newly-created account to a neutral value. For authenticity scores, a neutral value may indicate that the user has not engaged in any activity or that the account cannot be identified as a fake account or an authentic account. For reputation scores, a neutral value may indicate that the user has not engaged in any activity or has not established a reputation in any subject area. According to one embodiment, the neutral value may indicate that the social networking system 130 has no data upon which to evaluate the new account for authenticity or reputation. At block 403, the social networking system places the account in neutral authenticity and reputations tiers. The neutral authenticity and reputation tiers may include accounts whose authenticity and reputation scores are set to neutral values as determined in block 402.

At block 404, the social networking system 130 receives at least one activity associated with the account. The activity may be the addition of a friend, a status update, the uploading of a profile picture, a comment, or any other type of activity. The activity may originate from the account or from a friend's account, such as the removal of a photo tag by a user of the friend's account that had been applied by a user of the account. At block 405, the social networking system 130 adjusts the account authenticity score based on the activity. At block 406, the social networking system 130 determines whether, based on the account authenticity score, the account has met an upper criterion relative to its current authenticity tier. The upper criterion may represent a value indicative of an account that is more likely to be authentic. If the account has met an upper criterion relative to its current authenticity tier, then at block 407, the social networking system 130 promotes the account to the next higher authenticity tier. The process 400 then proceeds to block 410. If, at block 406, the account has not met an upper criterion relative to its current authenticity tier, then at block 408, the social networking system 130 determines whether, based on the account authenticity score, the account has met a lower criterion relative to its current authenticity tier. The lower criterion may represent a value indicative of an account that is less likely to be authentic. If the account has met a lower criterion relative to its current authenticity tier, then at block 409, the social networking system 130 demotes the account to the next lower authenticity tier. The process 400 then proceeds to block 410. If, at block 408, the account has not met a lower criterion relative to its current authenticity tier, then the process proceeds to block 410. In blocks 406 and 408, the upper criterion and the lower criterion may be thresholds against which the authenticity score is compared.

At block 410, the social networking system 130 determines whether the activity pertains to any category. A category may correspond to a particular subject, field, topic, or area of interest. If the activity does not pertain to any category, then the process returns to block 404 and awaits the receipt of an activity associated with the account. If the activity pertains to a category, then at block 411, the social networking system 130 determines the category. At block 412, the social networking system 130 adjusts the reputation score of the account for the category based on the activity. At block 413, the social networking system 130 determines whether the account has met an upper criterion relative to its current reputation tier. If the account has met an upper criterion relative to its current reputation tier, then at block 414, the social networking system 130 promotes the account to the next higher reputation tier. The process then returns to block 404 and awaits the receipt of an activity associated with the account. If, at block 413, the account has not met an upper criterion relative to its current reputation tier, then at block 415, the social networking system 130 determines whether the account has met a lower criterion within its current reputation tier. If the account has met a lower criterion relative to its current reputation tier, then at block 416, the social networking system 130 demotes the account to the next lower authenticity tier. The process 400 then returns to block 404 and awaits the receipt of an activity associated with the account. If, at block 415, the account has not met a lower criterion relative to its current reputation tier, then the process 400 returns directly to block 404 and awaits the receipt of an activity associated with the account. In blocks 413 and 415, the criterion may be a threshold against which the reputation score is compared. According to one embodiment, the process 400 of FIG. 4 may be performed either partially or entirely by the reputation management module 148 and the authenticity detection module 150.

According to an embodiment, reputation and authenticity scores for an account may be determined or adjusted by formulae incorporating a variety of different attributes or considerations. These attributes may include, for example, the account user's number of friends, the account user's email address, whether the email address was imported from the contact list of another user, or the contents of the user's cookie. Because many of the attributes may change as the social networking system 130 receives activities and content associated with the account, the account scores may be continually updated. This may be done in real-time with each activity, after a set number of activities, or at regular time intervals. Any pattern or schedule for updating the user's scores may be used. According to one embodiment, certain types of activities may cause an account score to be computed dynamically (e.g., the account score is re-calculated every time particular types of activities are received by the social networking system 130). For example, an account score may be re-calculated each time the social networking system 130 receives login credentials corresponding to the account. This may occur to ensure that the account score is up-to-date while the account user is actively engaged within the social network. Similarly, the untagging by another user of a photo originally tagged by the account user, flagging by another user of a post by the account user as spam, the rejection by another user of a friend request sent by the account user, and reporting by another user of an account associated with the user may trigger the affected account score to be re-calculated. These types of activities may be indicative that the account may be fake. Any activity or combination of activities may trigger a user's score to be re-calculated.

FIG. 5 depicts a table 500 illustrating example attributes used to compute authenticity scores and reputation scores in accordance with an embodiment of the invention. As shown, each attribute may be modeled as a descriptively named variable 502. For example, a variable NumRejectedFriendRequests 508 corresponds to the number of instances that a user's request to become friends with another user was declined. The variables may include NumFriendsWhoRemovedMe, NumRejectedFriendRequests, NumGroupsJoined, NumSentFriendRequests, NumReceivedFriendRequests, NumPhotoTagsRemoved, UserAgent, RegistrationIP, LastLoginIP, NumProfilePics, and NumFriends.

In the illustrated embodiment, each variable has an associated importance value 504 and reliability value 506. The importance value represents the significance or weight of a variable in determining the authenticity or reputation score of an account. Not every type of activity is equally indicative of account authenticity or reputation. Some types of activities have a higher correlation with fake accounts or expertise in a particular category than others. In the illustrated example, the variable NumRejectedFriendRequests 508 has a very high importance value because accounts whose friend requests are declined may very likely be fake.

Similarly, the reliability value 506 denotes how likely the variable is to accurately convey information about the account. Often times, information cannot be determined to a level of absolute certainty. This is particularly true for information sources that are external to the social networking system 130. For example, a variable RegistrationIP 510 denoting the IP address from which the account was registered has a relatively low reliability value associated with it. This is because IP addresses can easily be "spoofed" and the IP data received by the social networking system 130 may not accurately represent a user's actual IP address. The importance value 504 and reliability value 506 for each variable 502 may be determined by the operator of the social networking system 130 through research and analysis of trends within the social networking system 130. Any suitable process for determining the importance value 504 and reliability value 506 may be used. According to one embodiment, the importance value 504 and reliability value 506 may correspond to the weight given to a variable in the formula or model used to determine user scores. According to another embodiment, the importance values and the reliability values may be expressed quantitatively (e.g., as percentages, real numbers, etc.) and qualitatively (e.g., as "high", "low", "good", "bad", "neutral", etc.). According to yet another embodiment, the importance value and the reliability value may be combined into one value.

According to another embodiment of the invention, a user account's scores may be determined in part by the scores of the user's friends' accounts. The scores of the user's friends' accounts may be particularly useful for detecting fake accounts. An assumption underlying this embodiment is that the accounts of friends of legitimate users are also likely to be legitimate, and that users of legitimate accounts are likely to have friends with legitimate accounts. Analogously, the accounts of friends of fake users are likely to be fake, and users of fake accounts are likely to have friends with fake accounts. According to one embodiment, the authenticity score and reputation score of an account i may be calculated according to the formula:

Sum of all scores of friends of account *i*/number of friends of account *i*

This approach can be particularly useful in detecting "subnetworks" of fake accounts. Often, users who seek to use the social networking system 130 for purposes that violate the policies of the social networking system 130 policies will act in groups by creating multiple accounts and "friend ing" each other. This creates the appearance of legitimacy because if a user with no friends begins engaging in activity, such as interactions with legitimate users, her account is more likely to be reported as fake to the operator of the social networking system 130. Having a list of friends may minimize the possibility of a user's account being reported as fake. Thus, according to an embodiment of the invention, the social networking system 130 may periodically adjust the authenticity score of an account by incorporating the scores of friend accounts. If a sub-network is detected—i.e., a group of accounts whose only friendships are with each other and none, or few, of whom are friends with an account not in the group—the operator of the social networking system 130 may conclude that all of the accounts are fake.

According to one embodiment of the invention, a reputation score of an account may also be determined in part by the reputation scores of friend accounts. This embodiment may be useful for users who wish to find other users of the social network with particular interests or expertise in certain fields. For example, user Jane Doe is a connoisseur of steak. Due to her multiple check-ins at steakhouses and frequent posts of steak-related content, her account gradually earns a high reputation score in a category corresponding to steak expertise on the social networking system 130. Because of the high steak reputation score of her account, the steak reputation scores of her friends' accounts also increase, even if they themselves have not posted any steak-related content. User Jeff Smith is seeking a recommendation for a good steakhouse and uses a search function to identify users within his group of friends whose accounts have high steak reputation scores. Jane Doe and Jeff Smith are not friends but they share a common friend, John Doe. Because Jane Doe's steak-related activity has caused the steak reputation score of her friend John Doe's account to increase, John Doe appears in Jeff Smith's search results. Jeff Smith reaches out to John Doe and asks for a steakhouse recommendation, and John Doe may respond by introducing Jeff Smith to his friend Jane Doe, resulting in a new friendship.

Figure 6:
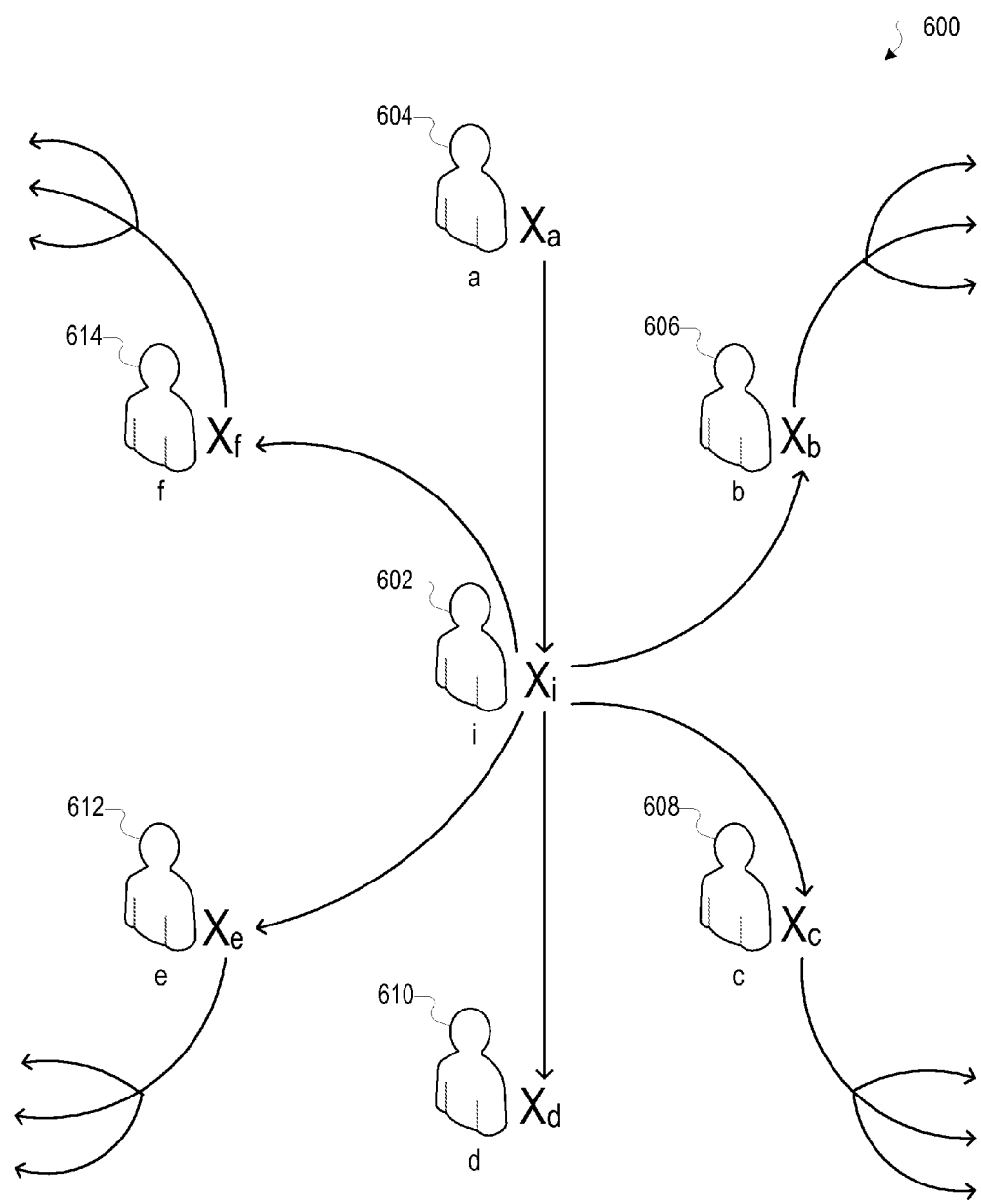
FIG. 6 depicts a diagram illustrating the effect of a change in the score of an account on the scores of other accounts in accordance with an embodiment of the invention.

According to an embodiment of the invention, the effect of an activity by one user may have far-reaching implications beyond that user's circle of friends. This is because accounts' scores are interdependent; when an account's score is modified as the result of an activity, friends' accounts' scores are affected because they are determined in part based upon the account's score. Similarly, scores of friends of the account's friends may be affected. The user's activity thus propagates through his group of friends and beyond. FIG. 6 depicts a diagram 600 that illustrates this propagative effect in accordance with an embodiment of the invention. Diagram 600 depicts a user i 602 and five of his friends, user a 604, user b 606, user c 608, user d 610, user e 612, and user f 614, whose accounts have authenticity scores $x_i$, $x_a$, $x_b$, $x_b$, $x_d$, $x_e$, and $x_f$, respectively. Each of the users has a single account within the social networking system 130. User i 602 may engage in the activity of forming a friendship with user a 604. If user a 604 is a new user whose account has a very low authenticity score, this may affect the authenticity score of the account of user i 602, which, in turn, would affect the authenticity scores of the accounts of user b 606, user c 608, user d 610, user e 612, and user f 614. According to one embodiment of the invention, the effect of a change in the score of the account of a friend on the score of a user account may be based on the number of degrees that separate the friend or the account user from the original activity that triggered the change. Thus, the effect of activity on the authenticity scores of other accounts may gradually dissipate as it propagates through the social networking system 130. The social networking system 130 may stop propagating the effect of the activity when a criterion has been met. According to one embodiment, the criterion may be a threshold value against which the degrees of separation between the friends and the account in question are compared.

Figure 7:
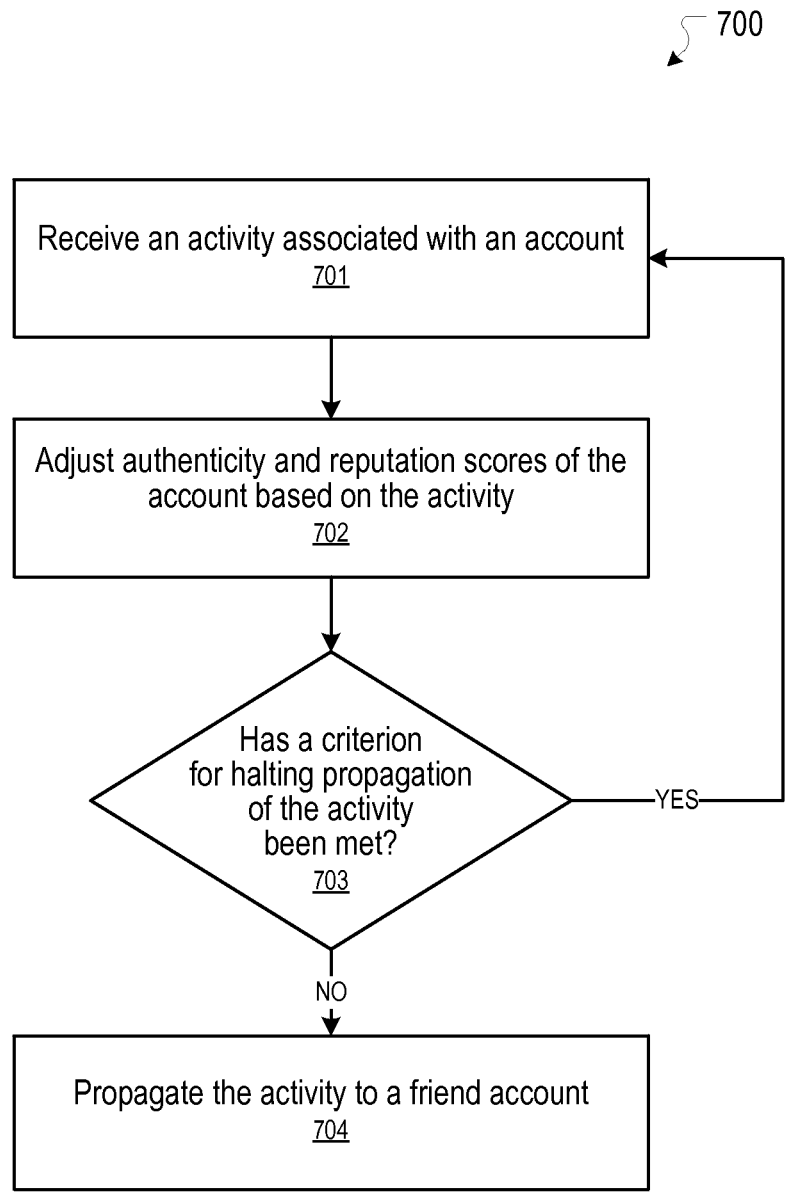
FIG. 7 illustrates a process for propagating the effect of an activity on the authenticity and reputation scores of accounts throughout a social network in accordance with an embodiment of the invention.

FIG. 7 illustrates a process 700 for propagating the effect of an activity on the authenticity and reputation score of accounts throughout the social networking system in accordance with an embodiment of the invention. At block 701, the social networking system 130 receives at least one activity associated with the account. The activity may be the addition of a friend, a status update, the uploading of a profile picture, a comment, or any other type of activity. The activity may originate from the account or from a friend's account, such as the removal of a photo tag by a user of the friend's account that had been applied by a user of the account. At block 702, the social networking system 130 adjusts the authenticity and reputation scores of the account based on the activity. At block 703, the social networking system 130 determines whether a criterion for halting propagation of the activity has been met. The criterion may be a threshold value against which the degrees of separation between the account and the account with which the activity originated is compared. If the criterion has not been met, then at block 704, the social networking system 130 propagates the activity to a friend account of the account. If the criterion has been met, then the process 700 returns to block 701 and awaits the receipt of an activity.

According to one embodiment, an account may be flagged as fake even though its authenticity score remains high or has not even changed. This may occur if multiple accounts are determined to belong to the same user. As noted above, many social networks may restrict users to one account per person. If the social networking system 130 only requires a valid email address to create an account, a user with an existing account may circumvent this restriction by using a separate email address to create another account. The social networking system 130 may use tests and formulae specifically directed toward detecting multiple accounts that belong to a single user. For example, according to one embodiment, the social networking system 130 may compare the friends lists of two accounts and determine that they belong to the same person because they share an unusually high number of common friends. According to another embodiment, the social networking system 130 may detect that two separate accounts are frequently accessed from the same IP address and determine that they both belong to the same person. Any technique for detecting multiple accounts may be used. After detecting that a user has multiple accounts, the social networking system 130 may flag all of the accounts as fakes and take action against them. If the user has created the accounts for malicious or prohibited purposes, the operator of the social networking system 130 may terminate all of the user's accounts. If the user has created the accounts for benign purposes, the operator of the social networking system 130 may deactivate all of the user's accounts, ask her to choose one, re-activate the account the user has chosen, and terminate the remainder.

Figure 8:
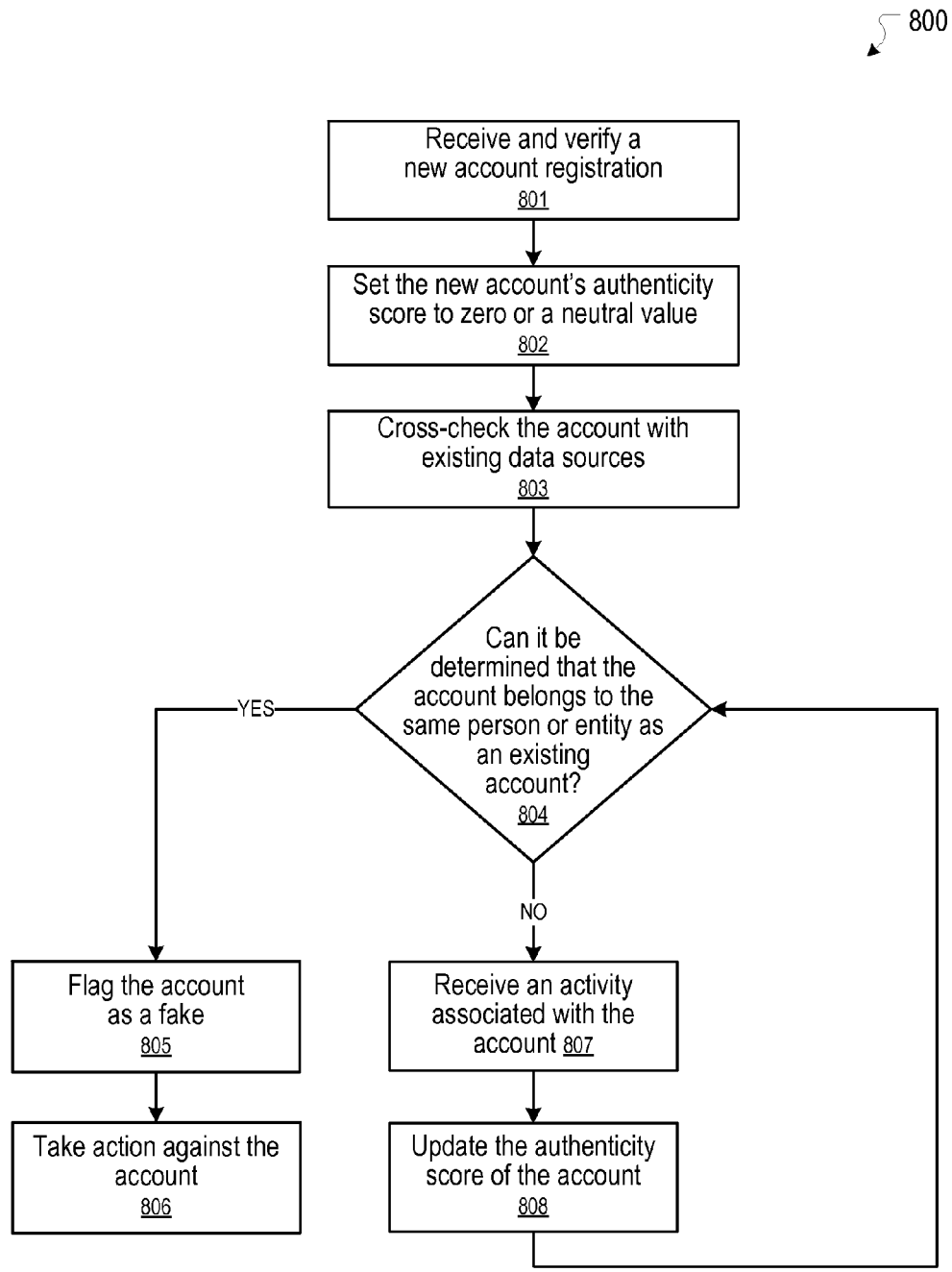
FIG. 8 illustrates a process for detecting users with multiple accounts in accordance with an embodiment of the invention.

FIG. 8 illustrates a process 800 for detecting users with multiple accounts in accordance with an embodiment of the invention. At block 801, the social networking system 130 receives and verifies a new account registration. Any suitable process for registering and verifying an account may be used. At block 802, the social networking system 130 sets the authenticity score of the account to a neutral value. The neutral value may indicate that the social networking system 130 may not have enough information to determine whether the account is authentic or a fake. At block 803, the social networking system 130 cross-checks the account with existing data sources to determine if the user already has an account. This may be done using several data checks that are available even if the user has not engaged in any activity or generated any content. For example, an account can be identified as a duplicate if there is an existing account belonging to a user with the same name and birthday as the user of the new account, if the two accounts have a substantial number of common friends, if the two accounts are associated with similar posted content, etc. Any technique for cross-checking a new account may be used. At block 804, the social networking system 130 determines if the new account belongs to the same person or entity as an existing account. The social networking system 130 may base this determination on data or activity associated with the new account or a separate account and on pre-determined criteria for evaluating the data or activity. For example, the social networking system 130 may determine that the number of instances the account was accessed from the same IP address as an existing account has met or exceeded a threshold. The operator of the social networking system 130 may notice that the new account has been linked from a user profile of a separate account and labeled as "my other account". Alternatively, the social networking system 130 may not be able to definitively conclude that the account belongs to the same user as another account. The operator of the social networking system 130 may have no data or activity on the basis of which to conclude that the account belongs to the same user as an existing account, or may have data and activity that raises suspicion but does not rise to a threshold level of certainty.

If, at block 804, the social networking system 130 determines that the account belongs to the same person or entity as an existing account, then at block 805, the social networking system 130 flags the account as a fake. At block 806, the social networking system 130 takes some action against the account. If, at block 804, the social networking system 130 cannot determine that the account belongs to the same person or entity as any existing account, no action is taken until the social networking system 130 receives an activity from the user at block 807. At block 808, the social networking system 130 updates the user's authenticity score. The process 800 then returns to block 804. Thus, with every iteration of the process 800, the social networking system 130 has more data associated with the account upon which to base its determination of whether the account belongs to the same user as an existing account. According to one embodiment, the process 800 of FIG. 8 may be performed either partially or entirely by the authenticity detection module 150.

According to one embodiment, account authenticity or reputation may be determined by information associated with the account user received from data sources. These data sources may include internal or external sources or databases of "trusted" users. According to one embodiment, the information may be used in lieu of an authenticity or reputation score. Alternatively, authenticity or reputation scores may be determined exclusively on the basis of information received from a data source. In one embodiment, the social networking system 130 receives information from external sources who have data about users of the social network. Many companies operate services that verify people's reputations or trustworthiness. For example, consumer credit reporting agencies such as Equifax, TransUnion, and Experian track people's creditworthiness. These companies maintain detailed credit histories of many people. According to one embodiment, the social networking system 130 has access to the data of a consumer credit reporting agency. Alternatively, the social networking system 130 may have a verification agreement with a consumer credit reporting agency that allows the agency to provide the social networking system 130 with information on new users. In this embodiment, a user account's authenticity score can be determined based in part on whether or not the user has a credit profile with the agency. If the name provided with a new account does not have a credit profile associated with it, the social networking system 130 may use this information to flag that account as possibly fake. According to another embodiment, if the information associated with the account initially or subsequently does not match information in the credit profile, the social networking system 130 may flag the account as possibly fake. According to yet another embodiment, information received from a consumer credit reporting agency may be used to adjust a reputation score for an account in a category corresponding to financial trustworthiness, which may then be used to block or facilitate certain financial transactions by the account user within the social networking system 130.

According to one embodiment of the invention, the social networking system 130 may compare new account registrations and friend lists with data sources comprising names that the operator of the social networking system 130 has deemed to be genuine or trustworthy. The authenticity scores of accounts belonging to such genuine or trustworthy names can be increased incrementally or increased to satisfy an authenticity threshold so that the account is temporarily or permanently deemed authentic by the social networking system 130. For example, the operator of the social networking system 130 may regard its own employees as reputable and trustworthy. According to one embodiment, the social networking system 130 cross-checks newly created accounts with its own employee records and automatically increases the authenticity score of a new account that belongs to a current or former employee. Similarly, the social networking system 130 may increase the authenticity scores of the accounts of users who become friends with current or former employees. This is because an employee of the operator of the social networking system 130 is unlikely to send a friend request to or accept a friend request originating from a fake account. Similarly, the operator of the social networking system 130 may have agreements with university networks and corporate networks that allow it to verify users who use university and corporate email addresses to register new accounts.

According to another embodiment of the invention, the social networking system 130 may use information from third-party reputation management companies. A number of companies have emerged that provide Internet users with tools to manage their online reputations. These companies may certify to other entities that a particular user is reputable or an expert in a certain field. The social networking system 130 may receive a certification from such a company that the user has established a reputation in a certain field and increase the reputation score of the user's account corresponding to that field. Any source of data for computing authenticity and reputation scores may be used. According to one embodiment, the sources of data external to the social networking system 130 may be used to set an initial value or a permanent value for authenticity and reputation scores that are not neutral values.

According to one embodiment of the invention, content posted by a user may be evaluated for substance in order to modify the reputation score of the user's account for a category corresponding to a given field. This evaluation may be implemented by using natural language processing techniques to parse comments or articles posted by the user and semantically identify words or phrases that pertain to a particular topic or area of expertise. By using algorithms and formulae to determine the context of the user's comments, the social networking system 130 may determine whether the presence of those words or phrases indicates that the user has expertise or an interest in the field. An indication of such expertise or interest may dictate the reputation score of the user's account or may cause the reputation score of the user's account to increase to an extent commensurate with the level of such expertise or interest. The social networking system 130 may also evaluate comments and "likes" of other users on content posted by the user in order to determine or increase the reputation score of the user's account. According to one embodiment, users may "tag" their posts with labels identifying the topic or subject matter of the post. The social networking system 130 may correlate the tag with a category in order to adjust the particular reputation score, associated with the category, of the accounts of the user who created the post and the users who "liked" or commented on it. Any suitable technique for evaluating the substance of content posted by users may be used.

Figure 9A:
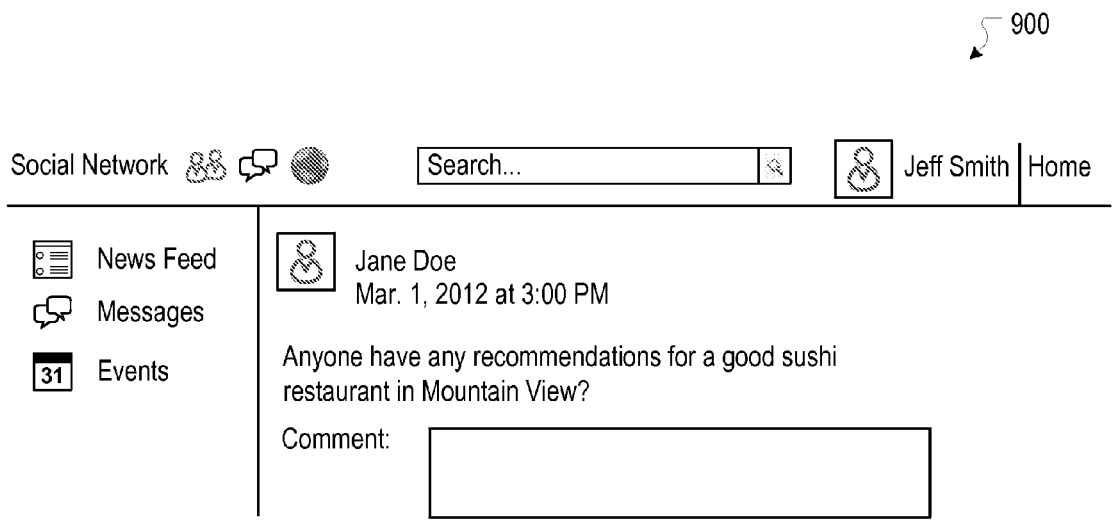
FIG. 9A depicts a status update posted by a user appearing in the news feed of another user in accordance with an embodiment of the invention.
Figure 9B:
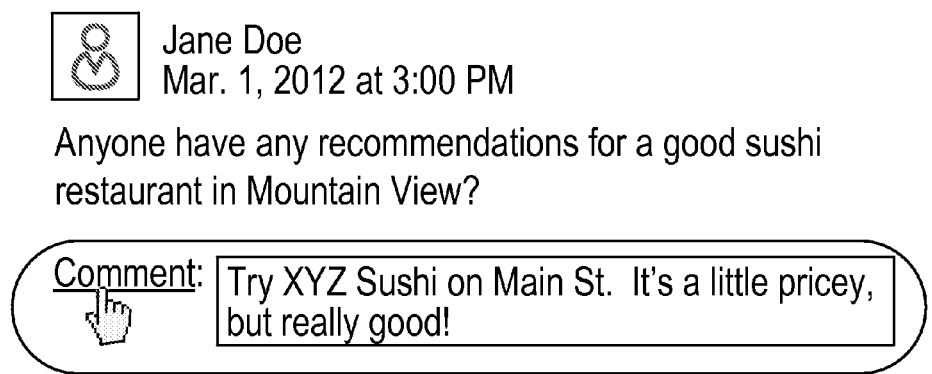
FIG. 9B depicts a comment by a user on the status update by another user in accordance with an embodiment of the invention.

FIGS. 9A, 9B, 9C, and 9D illustrate examples of activities causing adjustments to reputation scores according to an embodiment of the invention. FIG. 9A depicts a status update 900 posted by user Jane Doe appearing in user Jeff Smith's news feed. Jane Doe has requested recommendations for a good sushi restaurant in Mountain View. As shown in FIG. 9B, user Jeff Smith sees Jane Doe's status update and posts a comment 910 recommending XYZ Sushi on Main St. The social networking system 130 detects both user Jane Doe's activity of posting a status update and user Jeff Smith's activity of commenting on Jane Doe's status update. As shown in FIG. 9C, a semantic analysis of both the status update and the comment reveal that, based on the presence of the word "sushi" 920, they both pertain to the particular category of sushi. The social networking system 130 may conclude that users Jane Doe and Jeff Smith both have an interest in sushi. However, as shown in FIG. 9D, a more detailed analysis reveals that user Jane Doe's status update was a request for a recommendation based on the word "recommendations" 930 and a question mark 940, whereas user Jeff Smith's comment was a response offering such a recommendation based on the word "try" 950 and an exclamation point 960. Thus, the social networking system 130 may conclude that user Jane Doe merely has an interest in sushi, whereas user Jeff Smith has expertise in sushi. Consequently, as shown in FIG. 9E, the social networking system 130 may increase reputation scores in the category corresponding to sushi for the accounts of Jane Doe and Jeff Smith, but by a greater amount for Jeff Smith than for Jane Doe. While Jane Doe's account reputation score for sushi is increased by 2 points, Jeff Smith's account reputation score for sushi is increased by 4 points. In addition, because the postings of Jane Doe and Jeff Smith did not pertain to cameras, their account reputation scores for cameras remain unchanged.

According to one embodiment of the invention, the social networking system 130 may determine the reputation score of a user's account in part from his interaction with third party portals. If a user has an interest in a particular topic, this may be reflected in his web browsing history. The user is likely to have expertise or an interest in a particular subject if he regularly browses websites pertaining to that subject. The social networking system 130 may gain access to the user's browsing history through a variety of techniques. According to one embodiment, the social networking system 130 may provide an application programming interface (API) that allows third-party portals to integrate certain functionality and content of the social networking system 130. For example, a third party portal may allow its users to use their accounts on the social networking system to authenticate and post content within the portal. One effect of this feature is that the social networking system 130 may track its users' visits to sites that use the application programming interface of the social networking system 130. The social networking system 130 may also access content such as blog comments generated by its users on sites that use its application programming interface. In certain situations, the social networking system 130 may access users' browsing history through the cookies on their computer to learn of the users' visits to sites that do not use the application programming interface of the social networking system 130, or otherwise have no data-sharing relationship with the operator of the social networking system 130. Any suitable technique for accessing the user's browsing history or content posted by users on third party portals may be used. The social networking system 130 may process this information by determining the subject matter of sites visited by a user, and the content the user generated on them, and boost the reputation score of the user's account for the corresponding category.

Figure 10:
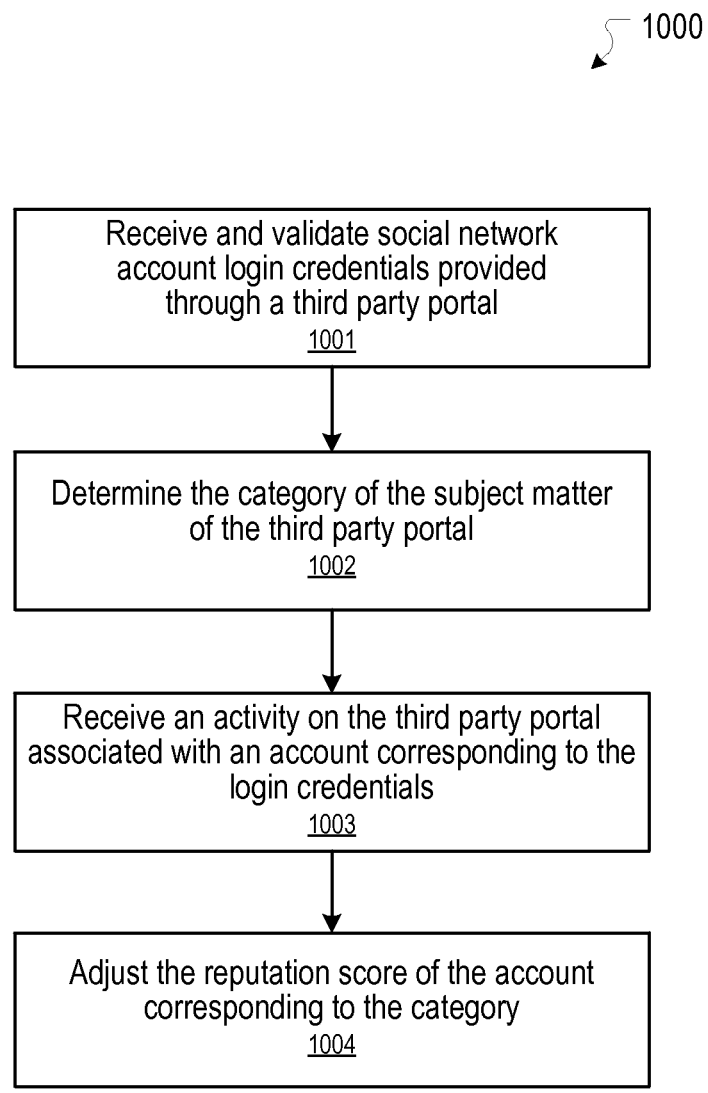
FIG. 10 illustrates a process for incorporating user activity on a third party portal into a reputation score in accordance with an embodiment of the invention.

FIG. 10 illustrates a process 1000 for incorporating user activity on a third party portal into a reputation score in accordance with an embodiment of the invention. Initially, the user visits a third party content portal. The third party portal may be any website on a separate Internet domain that is not under the control of the social networking system 130. According to an embodiment, the third party portal uses the login functionality of the social networking system 130 to allow users to authenticate to the portal using their account login credentials from the social networking system 130. Thus, the user logs into the third party portal using the credentials of his account on the social networking system 130. The third party portal may provide this feature by using an application programming interface provided by the social networking system 130 that allows third party portals to integrate aspects of the functionality provided by the social networking system 130 into their user experience. At block 1001, the social networking system 130 receives and validates login credentials provided through the third party portal. At block 1002, the social networking system 130 determines the category of the subject matter of the third party portal. According to one embodiment, this may be carried out by a semantic analysis of the third party portal's content. A category may correspond to a distinct field, subject, topic, or area of interest. Alternatively, the social network may have previously categorized the third party portals that use its API according to the same classification scheme used to categorize reputation scores. In such a case, the social networking system 130 may simply look up the category of the third party portal in an internal database. Any process for determining the category of the third party portal may be used. According to another embodiment, the social networking system 130 may determine the subject matter of the third party portal and correlate it to a category. At block 1003, the social networking system 130 records the user's activity with the third party portal. The information recorded about the user's visit may include, for example, the user's blog comment, a photo upload, an article read by a user, or other interactions by the user with the third party portal. At block 1004, the social networking system 130 adjusts the reputation score of the user's account in the category corresponding to the subject matter of the third party portal based on the user's activity with the third party portal. According to one embodiment, the process 1000 of FIG. 10 may be performed either partially or entirely by the reputation management module 148.

Hardware Implementation

Figure 11:
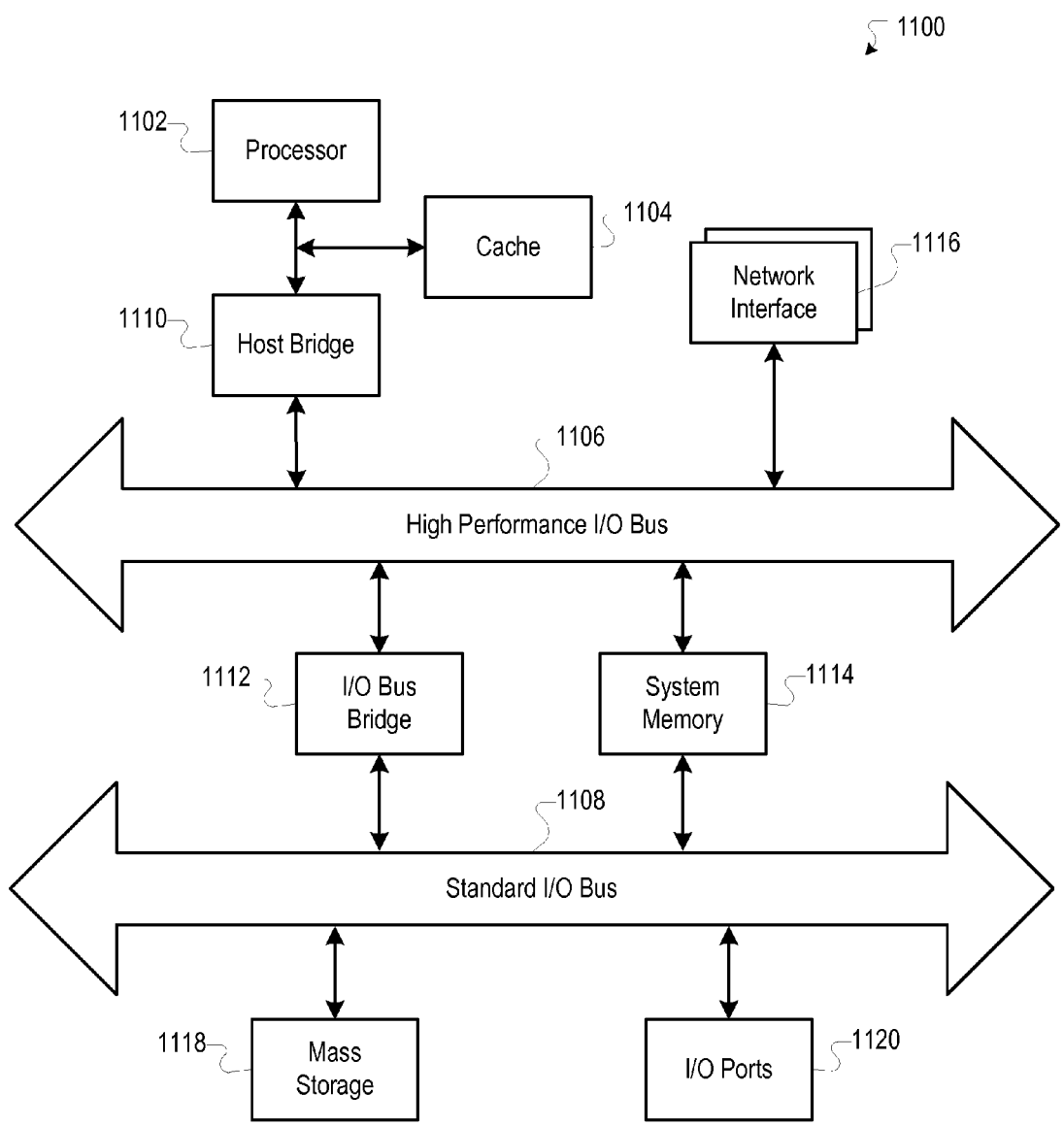
FIG. 11 depicts an example hardware implementation of the invention in accordance with an embodiment of the invention.

The foregoing processes and features can be implemented by a wide variety of machine and computer system architectures and in a wide variety of network and computing environments. FIG. 11 illustrates an example of a computer system 1100 that may be used to implement one or more of the computing devices described herein. The computer system 1100 includes sets of instructions for causing the computer system 1100 to perform the processes and features discussed herein. The computer system 1100 may be connected (e.g., networked) to other machines. In a networked deployment, the computer system 1100 may operate in the capacity of a server machine or a client machine in a client-server network environment, or as a peer machine in a peer-to-peer (or distributed) network environment. In an embodiment of the invention, the computer system 1100 may be the social networking system 130, the user device 110, and the external system 120, or a component thereof. In an embodiment of the invention, the computer system 1100 may be one server among many that constitutes all or part of the social networking system 130.

The computer system 1100 includes a processor 1102, a cache memory 1104, and one or more executable modules and drivers, stored on a computer-readable medium, directed to the processes and features described herein. Additionally, the computer system 1100 includes a high performance input/output (I/O) bus 1106 and a standard I/O bus 1108. A host bridge 1110 couples processor 1102 to high performance I/O bus 1106, whereas I/O bus bridge 1112 couples the two buses 1106 and 1108 to each other. A system memory 1114 and one or more network interfaces 1116 couple to bus 1106. The computer system 1100 may further include video memory and a display device coupled to the video memory (not shown). Mass storage 1118 and I/O ports 1120 couple to the bus 1108. The computer system 1100 may optionally include a keyboard and pointing device, a display device, or other input/output devices (not shown) coupled to the bus 1108. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1100 are described in greater detail below. In particular, the network interface 1116 provides communication between the computer system 1100 and any of a wide range of networks, such as an Ethernet (e.g., IEEE 802.3) network, a backplane, etc. The mass storage 1118 provides permanent storage for the data and programming instructions to perform the above-described processes and features implemented by the respective computing systems identified above, whereas the system memory 1114 (e.g., DRAM) provides temporary storage for the data and programming instructions when executed by the processor 1102. The I/O ports 1120 may be one or more serial and/or parallel communication ports that provide communication between additional peripheral devices, which may be coupled to the computer system 1100.

The computer system 1100 may include a variety of system architectures, and various components of the computer system 1100 may be rearranged. For example, the cache 1104 may be on-chip with processor 1102. Alternatively, the cache 1104 and the processor 1102 may be packed together as a "processor module", with processor 1102 being referred to as the "processor core". Furthermore, certain embodiments of the invention may neither require nor include all of the above components. For example, peripheral devices coupled to the standard I/O bus 1108 may couple to the high performance I/O bus 1106. In addition, in some embodiments, only a single bus may exist, with the components of the computer system 1100 being coupled to the single bus. Furthermore, the computer system 1100 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1100 that, when read and executed by one or more processors, cause the computer system 1100 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1100, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1102. Initially, the series of instructions may be stored on a storage device, such as the mass storage 1118. However, the series of instructions can be stored on any suitable computer readable storage medium. Furthermore, the series of instructions need not be stored locally, and could be received from a remote storage device, such as a server on a network, via the network interface 1116. The instructions are copied from the storage device, such as the mass storage 1118, into the system memory 1 and then accessed and executed by processor 1102.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1100 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described that may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method comprising:
    initiating, by at least one computer device, a neutral value as a first category-specific reputation score associated with a content topic reputation category for a first account in a social networking system, wherein the content topic reputation category corresponds to a content topic for one or more user activities in the social networking system;
    monitoring, by the at least one computer device, the social networking system to identify a new user activity propagating through the social networking system, wherein the new user activity is performed by or associated with the first account, wherein said monitoring includes identifying the new user activity as being associated with the content topic;
    adjusting, in real-time in response to identifying the new user activity as being associated with the content topic via the at least one computing device, the first category-specific reputation score for the first account in the content topic reputation category, wherein said adjusting is by increasing or decreasing the first category-specific reputation score by an amount based solely on data related to the new user activity; and
    publicizing the first category-specific reputation score in the social networking system to identify the first account as associated with trustworthy content in the content topic reputation category.

2. The computer-implemented method of claim 1, wherein said identifying the new user activity includes determining that the content topic reputation category represents subject matter in which a user of the first account has interest.

3. The computer-implemented method of claim 1, wherein said identifying the new user activity associated with the content topic reputation category is based on web browsing history of the first account.

4. The computer-implemented method of claim 1, wherein the new user activity is an interaction of the first account with a website.

5. The computer-implemented method of claim 4, wherein said identifying the new user activity associated with the content topic reputation category is based on correlation of the website with one of a plurality of selected categories.

6. The computer-implemented method of claim 4, wherein the website is integrated at least in part with the social networking system.

7. The computer-implemented method of claim 4, wherein the website is published by the social networking system.

8. The computer-implemented method of claim 1, wherein said adjusting the first category-specific reputation score is based on content posted by the first account as indicated in the new user activity.

9. The computer-implemented method of claim 1, wherein said adjusting the first category-specific reputation score is based on a semantic analysis of content associated with the first account as indicated in the new user activity.

10. The computer-implemented method of claim 1, wherein the first account is associated with a category-specific reputation score for each of a plurality of reputation categories associated respectively with a plurality of content topics.

11. The computer-implemented method of claim 1, wherein the first account is associated with the first category-specific reputation score in a first category and a second category-specific reputation score in a second category.

12. The computer-implemented method of claim 11, wherein the first category-specific reputation score and the second category-specific reputation score have different values.

13. The computer-implemented method of claim 11, further comprising adjusting, based on the new user activity, the second category-specific reputation score, wherein the first category-specific reputation score and the second category-specific reputation score are adjusted differently.

14. The computer-implemented method of claim 11, wherein said identifying the new user activity includes determining that the new user activity is not associated with the second category; and
　responsive to determining that the new user activity is not associated with the second category, leaving the second category-specific reputation score unchanged.

15. The computer-implemented method of claim 1, further comprising adjusting a second category-specific reputation score of a second account based on the first category-specific reputation score of the first account.

16. The computer-implemented method of claim 15, further comprising adjusting a third category-specific reputation score of a third account based on the second category-specific reputation score of the second account.

17. The computer-implemented method of claim 1, wherein said adjusting the first category-specific reputation score is based on evaluating data associated with the new user activity that is external to the social networking system.

18. A computer storage apparatus storing computer executable instructions that, when executed, cause a computer system to perform a computer-implemented method comprising:
　initiating, by at least one computer device, a neutral value as a first category-specific reputation score associated with a content topic reputation category for a first account in a social networking system, and wherein the content topic reputation category corresponds to a content topic in the social networking system;
　monitoring, by the at least one computer device, the social networking system to identify a new user activity propagating through the social networking system, wherein the new user activity is performed by or associated with the first account and associated with the content topic;
　adjusting, in real-time in response to identifying the new user activity as being associated with the content topic, the first category-specific reputation score for the first account in the content topic reputation category, wherein said adjusting is by increasing or decreasing the first category-specific reputation score by an amount based on the new user activity; and
　publicizing the first category-specific reputation score in the social networking system to identify the first account as associated with trustworthy content in the content topic reputation category.

19. A system comprising:
　at least one processor; and
　a memory storing instructions configured to instruct the at least one processor to perform:
　initiating, by at least one computer device, a neutral value as a first category-specific reputation score associated with a content topic reputation category for a first account in a social networking system, wherein the content topic reputation category corresponds to a content topic in the social networking system;
　monitoring, by the at least one computer device, the social networking system to identify a new user activity propagating through the social networking system, wherein the new user activity is performed by or associated with the first account and associated with the content topic, and wherein the content topic reputation category corresponds to a content topic category in the social networking system;
　adjusting, in real-time in response to identifying the new user activity as being associated with the content topic, the first category-specific reputation score for the first account in the content topic reputation category, wherein said adjusting is by increasing or decreasing the first category-specific reputation score by an amount based on the new user activity; and
　publicizing the first category-specific reputation score in the social networking system to identify the first account as associated with trustworthy content in the content topic reputation category.

20. The computer-implemented method of claim 1, wherein the neutral value as the first category-specific reputation score is initiated when the first account is created in the social networking system.

\* \* \* \* \*